Aug. 19, 1958

R. E. ALLISON 2,848,699

VARIABLE INDUCTANCE

Filed Aug. 27, 1953

RALPH E. ALLISON
INVENTOR.

BY Hazard & Miller
ATTORNEYS

United States Patent Office 2,848,699
Patented Aug. 19, 1958

2,848,699

VARIABLE INDUCTANCE

Ralph E. Allison, Whittier, Calif., assignor to Patent Management, Incorporated, Minneapolis, Minn., a corporation of Minnesota Application August 27, 1953, Serial No. 376,881

14 Claims. (Cl. 336—45)

This invention relates to improvements in variable inductance, and while not restricted thereto, is of particular advantage in the design and construction of variable audio frequency inductors.

The invention may be considered as a further development of the invention disclosed in my copending application for an Inductance Device, Serial No. 273,909, filed February 28, 1952, now Patent No. 2,719,276, issued September 27, 1955.

In the above-mentioned application I have disclosed an inductance consisting essentially of two spaced cores extending through a coil adapted to be energized with an alternating voltage and a magnetic shunt connecting the cores in a direction transverse to the paths of magnetic flux through the cores, together with a magnetic flux generator either in the form of a permanent magnet or an electromagnet which impresses magnetic flux on the cores so as to pass sequentially through a portion of one core, through the magnetic shunt, and partially through the other core. In one form of the invention the magnetic flux generator which is either in the form of a permanent magnet or an electromagnet is movable toward and away from the cores so that the magnetic flux generated thereby and which passes through the portions of the core and the magnetic shunt is variable.

In the present invention this feature of the construction is utilized to provide a variable inductance of relatively wide range as compared with the variable inductances heretofore placed on the market. However, the influence of the magnetic flux generator on the cores depends upon its spacing from the cores and as the influence varies with the square of the distance that the magnetic flux generator is from the cores, difficulties arise in calibrating the adjusting means for the magnetic flux generator. Stated in another manner, if the magnetic flux generator is adjusted toward and away from the cores by a rotary shaft on which a dial is mounted and the dial is calibrated with calibrations that are equally spaced from each other or substantially so, and the connection between the rotary shaft and the magnetic flux generator is such that the magnetic flux generator is moved directly in accordance with rotary movements of the shaft, then the dial will not correctly indicate changes of inductance. On the other hand, if the rotray shaft on which the dial is mounted is so connected to the magnetic flux generator that the magnetic flux generator will be adjusted toward and away from the cores directly in accordance with rotation of the shaft and the dial is to correctly indicate variations in inductance, then the dial must be specially calibrated, crowding calibrations close together near one end of scale and spacing them widely near the other end of the scale. That end of the scale which has the calibrations crowded is used when the magnetic flux generator is very close to the cores and that end of the scale which has the calibrations widely spaced is used when the magnetic flux generator is spaced considerably from the cores. This is due to the fact that small changes in position of the magnetic flux generator with respect to the cores produce substantial changes in inductance when the magnetic flux generator is quite close to the cores, whereas when the magnetic flux generator is remote from the cores, considerable change in position is required to effect a corresponding change of inductance. When the calibrations are crowded together near one end of the scale an accurate reading of the scale is rendered difficult. But the greatest objection to such a construction is the individual calibration of each inductance.

It is a primary object of the present invention to provide an improved variable inductance wherein the magnetic flux generator is adjusted by a rotary shaft on which there is a dial, the calibrations of which are equally spaced or substantially so, and to so connect such rotary shaft to the magnetic flux generator that when the rotary shaft is rotated in accordance with an arithmetical progression, the magnetic flux generator will be adjusted toward and away from the cores in accordance with a geometrical progression. In this way, an automatic compensation is made for the fact that the influential effect of the magnetic flux generator on the cores varies in accordance with the square of the distance between the magnetic flux generator and the cores. Consequently, with such a construction a conventional or standard dial having calibrations that are equally spaced or substantially so, may be used on the shaft and will correctly indicate changes in inductance created by the adjustment. This is of advantage in that the califration of each dial may be avoided and standard dials may be used in commercial production. Furthermore, as the graduations are equally spaced, accurate readings of the dial are obtainable at all positions of adjustment.

The cores of the inductance herein disclosed may be either formed of laminated metal or of ferrite, ferrite being preferable. Ferrites used for this purpose are in the nature of ferromagnetic ceramic materials which are a mixture of crystals of iron oxide with various other metallic oxides (not metals). The general formula for these ferrites is $MOFe_2O_6$ where M stands for a bivalent metal such as magnesium, nickel or zinc. No metals in metallic form and no organic compounds are ordinarily contained in the ferrite material.

Ferrites as commercially produced, however, have considerable variations in permeability or reluctance. This variation may be as severe as plus or minus 20% in permeability from batch to batch of the same type of ferrite. Consequently, if the dial on the shaft of the variable inductor is adjusted so that it correctly indicates the inductance in henrys at one end of the scale, the readings given at the other end of the scale may be erroneous to the extent of plus or minus 20% due to the lack of uniformity in the permeability of the ferrite.

It is, therefore, another object of the present invention to provide a means by which a correction can be made so that despite the differences in permeability in different ferrite cores, an easy and highly satisfactory adjustment or correction can be made so that the dial on the shaft will correctly indicate the inductance. This enables two or more inductors to be adjusted or controlled by the same knob or shaft and a correct reading obtained for every dial setting. This is very advantageous in variable filter design where several inductors may have to be controlled simultaneously and have the same changes in inductance therein.

With the foregoing and other objects in view, which will be made manifest in the following detailed description and specifically pointed out in the appended claims, reference is had to the accompanying drawings for an illustrative embodiment of the invention, wherein:

Figure 1:
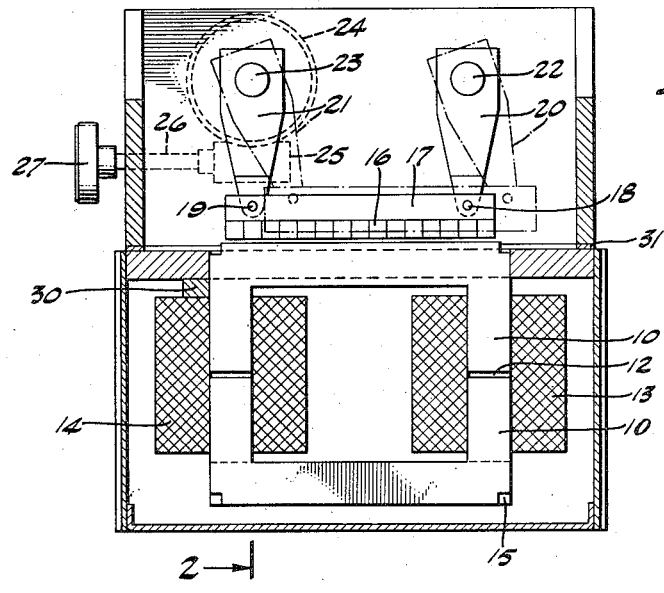
Figure 1 is a vertical section through a variable inductance embodying the present invention.
Figure 3:
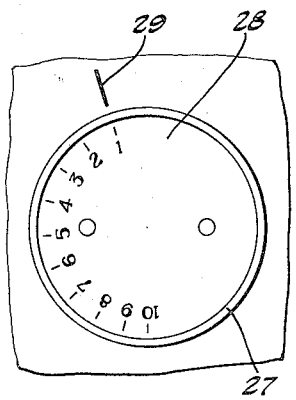
Fig. 3 is a partial view, illustrating a typical dial that may be employed on the rotary adjusting shaft.

Referring to the accompanying drawing wherein similar reference characters designate similar parts throughout, the improved variable inductance, in its simplified form, consists of two spaced parallel cores 10 and 11. These cores may be formed of laminated metal but are preferably formed of ferrite. They may be completely closed cores or may have air gaps 12 therein. With or without air gaps the cores 10 and 11 are generally regarded as being closed cores. Portions of the cores are encircled by windings and while I have illustrated the cores 10 and 11 as being encircled by two windings 13 and 14, only one of these windings is actually necessary.

A magnetic shunt 15 bridges the space between the two cores 10 and 11. A magnetic flux generator 16 is arranged transversely with respect to the cores. This magnetic flux generator may consist of a single permanent magnet or a plurality of permanent magnets arranged in side by side relationship as illustrated, or it may even consist of an electromagnet supplied with direct current of constant potential. This magnetic flux generator, whatever its form may be, is so arranged that magnetic flux created or generated thereby is caused to pass in a sequential manner through a portion of the core 10 through the magnetic shunt 15 and through a portion of the core 11. The magnetic flux generator is mounted on a suitable holder or carrier 17. This carrier is pivotally connected at 18 and 19 to two cranks 20 and 21 which are pivotally mounted as at 22 and 23, respectively. In association with the crank 21 there may be a worm wheel 24 which meshes with a worm 25 on a rotary shaft 26 on which there is a knob 27. On the knob there is a dial 28 which may be of the standard or conventional type wherein its graduations or calibrations are equally spaced or substantially so.

As illustrated, the graduations progress from .1 henry to 1. henry, and these graduations are indicative of the inductance of the inductor. It will be appreciated that as the shaft 26 is rotated by the knob 27, the worm wheel 24 will cause the crank 21 to swing from the full-line position shown in Fig. 1 toward the dotted-line position therein. The crank 20 is merely caused to follow the movement of the crank 21 so that the carrier 17 maintains a parallel relationship to the tops of the cores in all positions. As the cranks 20 and 21 swing from the full-line positions to the dotted-line positions, it will, of course, be appreciated that the magnetic flux generator 16 moves away from the cores and its influence on the cores decreases in accordance with the square of the distance between the generator 16 and the cores 10 and 11. Conversely, if the knob 27 is reversely rotated to swing the cranks 20 and 21 in a clockwise direction from the dotted-line position to the full-line position, the magnetic flux generator 16 approaches the cores and the influence upon the cores increases with the square.

As the two cranks 20 and 21 swing about axes at the centers of the pivots 22 and 23, it will be appreciated that the magnetic flux generator 16 moves through an arc which is a portion of a circle. Consequently, the path of movement of the magnetic flux generator is in accordance with the curve, whose formula may be represented as $X^2+Y^2=1$. Consequently, for a rotation of the knob 27 through a given fraction of revolution, the cranks 20 and 21 will have imparted thereto a swinging movement of a commensurate fraction of a revolution, depending upon the gear reduction afforded by the worm 25 and the worm wheel 24. However, the actual spacing of the magnetic flux generator 16 from the cores brought about by this movement depends upon the position of the cranks. Thus, if a 1/10 revolution is given the knob 27 and the gear reduction afforded by the worm 25 and the worm wheel 24 is 1:10, a 1/100 revolution will be imparted to the cranks 20 and 21. This 1/100 of a revolution of these cranks when the cranks are nearly vertical, produces only a slight change in the spacing of the magnetic flux generator 16 from the cores. On the other hand, if the position of the cranks is approximately that illustrated by the dotted lines on Fig. 1, a similar 1/10 of a revolution of the knob 27 and a corresponding 1/100 of a revolution of the cranks 20 and 21 produces a much greater spacing of the magnetic flux generator from the cores than it initially possessed. Consequently, if the knob 27 is regarded as being rotated in accordance with an arithmetical progression the magnetic flux generator 16 moves toward or away from the cores in accordance with a geometrical progression. This compensates for the fact that the influence of the generator 16 upon the cores varies with the square of the distance between the generator and the cores. As this compensation is automatically present the graduations on the dial 28 may be equally spaced from each other or nearly so. Actually, there is some slight crowding of the graduations near one end of the scale to compensate for various factors such as leakage. With this arrangement it is possible to avoid hand calibrating each dial with each instrument. But a standard dial may be applied to the knob and adjusted relatively thereto so that at least one of its graduations will properly indicate the inductance of the instrument in that position.

As above explained, when the cores 10 and 11 are formed of ferrite the permeability or reluctance of the cores will vary from core to core. This variation may be as much as from plus 20% to minus 20%. Consequently, if the dial 28 is adjusted with relation to the knob 27 so that the .1 graduation thereon correctly indicates the inductance when the knob is positioned with this graduation opposite the index mark 29, a turning of the knob so that the graduation 1.0 is opposite the index 29 will not necessarily indicate that the inductance is 1.0 henry. The actual inductance may be 20% above this or 20% below. To compensate or make correction I provide an additional permanent magnet 30 that bridges the space between the cores 10 and 11. This magnet also generates a flux which passes consecutively through a portion of one core, across the shunt 15, and through a portion of another core. This magnet may be arranged to generate a flux sympathetically with the flux generated by the flux generator 16, or in opposition thereto depending upon whether the error is plus or minus. The amount of correction made by the magnet 30 is made by shifting the magnet 30 toward or away from the cores as occasion may require and then cementing or otherwise anchoring the magnet in position with relation thereto.

If the dial 28 is permanently impressed or embossed on the knob 27 so that it cannot be adjusted relatively thereto, adjustment to cause a graduation thereof to properly indicate the actual inductance is accomplished by positioning a spacer 31 between the frame or housing enclosing the cores and the supporting structure for the cranks 20 and 21. It is obvious that this spacer is increased so that it will space the generator 16 from the cores when the cranks 20 and 21 are in their lowermost positions. Conversely, if the spacer is made of reduced thickness, the generator 16 will be closer to the cores when the cranks are in their lowermost positions. In this way, the inductance may be adjusted with relation to any selected point or graduation on the dial. The adjustment may also be made by decreasing the strength of the magnetic flux generator 16. If this is in the form of one or more permanent magnets their strength may be decreased by withdrawing them from an alternating magnetic field.

Figure 2:
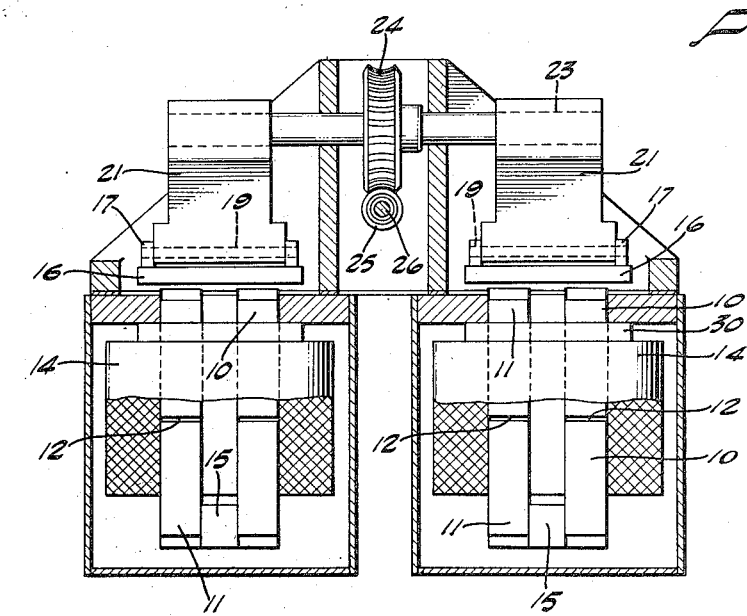
Fig. 2 is a vertical section taken substantially upon the line 2—2 upon Fig. 1.

The invention above described is highly useful in that it enables the use of standard or conventional dials wherein the graduations are equally spaced or substantially so. The inductance of the inductor can be adjusted with relation to this dial, and when the cores are formed of ferrite, a compensation may be made for differences in the permeability or reluctance of any particular specimen of ferrite used to make the core. Inasmuch as the inductance can be adjusted with relation to the dial on the knob it is obvious that two or more inductors can be each independently adjusted with relation to the same dial. Consequently, as clearly shown in Fig. 2, two inductors may be arranged in side by side relationship and connected to the same worm 24 so that their magnetic flux generators will be simultaneously adjusted with respect to their pairs of cores. Such a construction enables two or more inductors to be controlled by the same knob 27 and their graduations can be read correctly from the dial 28 for every dial setting. This is because each inductor has been individually adjusted to fit the same dial. This is very adavntageous in variable filter design where several inductors may have to be controlled simultaneously. The result is an extremely useful inductor for bridge measurements, setting up of experimental filters, and in other situations where a calibrated variable inductor is desirable.

Various changes may be made in the details of construction without departing from the spirit and scope of the invention as defined by the appended claims.

I claim:

1. A variable inductor comprising two spaced cores, a winding encircling portions of said cores, a magnetic shunt connecting the cores, magnetic flux generating means movable toward and away from said cores and arranged to have flux generated thereby pass sequentially through a portion of one core, through the shunt, and a portion of the other core, and dialed means for adjusting the flux generating means toward and away from the cores, said means having a shaft movable in accordance with an arithmetical progression, and means operable thereby connecting the shaft to the flux generating means for causing the flux generating means to move toward and away from the cores in accordance with a geometrical progression.

2. A variable inductor comprising two spaced cores, a winding encircling portions of said cores, a magnetic shunt connecting the cores, magnetic flux generating means movable toward and away from said cores and arranged to have flux generated thereby pass sequentially through a portion of one core, through the shunt, and a portion of the other core, dialed means for adjusting the flux generating means toward and away from the cores, said means having a shaft, and crank means operable thereby on rotation of the shaft for moving the flux generating means toward and away from the cores through an arc about the center of swing of the crank means.

3. A variable inductor comprising two spaced cores, a winding encircling portions of said cores, a magnetic shunt connecting the cores, magnetic flux generating means movable toward and away from said cores and arranged to have flux generated thereby pass sequentially through a portion of one core, through the shunt, and a portion of the other core, dialed means for adjusting the flux generating means toward and away from the cores, said means having a shaft, a pair of cranks on which the flux generating means is mounted, and a gear reduction means between the shaft and one of the cranks whereby as the shaft rotates in accordance with an arithmetical progression the flux generating means will be moved toward or away from the cores in accordance with a geometrical progression.

4. A variable inductor comprising two spaced ferrite cores which are closed except for small air gaps, a winding encircling portions of both of said cores, a magnetic shunt connecting the cores, magnetic flux generating means movable toward and away from the cores arranged to have the flux generated thereby pass sequentially through a portion of one core, through the shunt, and through a portion of the other core, and an adjusting magnet adjacent said cores also arranged to have the flux created thereby pass sequentially through a portion of one core, through the shunt, and through a portion of the other core.

5. A variable inductor comprising two spaced ferrite cores which are closed except for small air gaps, a winding encircling portions of both of said cores, a magnetic shunt connecting the cores, magnetic flux generating means movable toward and away from the cores arranged to have the flux generated thereby pass sequentially through a portion of one core, through the shunt, and through a portion of the other core, and an adjusting magnet adjacent said cores also arranged to have the flux created thereby pass sequentially through a portion of one core, through the shunt, and through a portion of the other core sympathetically with the flux generated by the flux generating means.

6. A variable inductor comprising two spaced ferrite cores which are closed except for small air gaps, a winding encircling portions of both of said cores, a magnetic shunt connecting the cores, magnetic flux generating means movable toward and away from the cores arranged to have the flux generated thereby pass sequentially through a portion of one core, through the shunt, and through a portion of the other core, and an adjusting magnet adjacent said cores also arranged to have the flux created thereby pass sequentially through a portion of one core, through the shunt, and through a portion of the other core in opposition to the flux generated by the flux generating means.

7. A variable inductor comprising a plurality of inductors each comprising a pair of spaced cores, a winding encircling portions of both of said cores, a magnetic shunt connecting the cores, magnetic flux generating means movable toward and away from said cores arranged to have the flux generated thereby pass sequentially through a portion of one core, through the shunt, and through a portion of the other core, a single rotary shaft common to all of the inductors, and means connecting the shaft to the magnetic flux generating means of each inductor to cause the flux generating means of each inductor to move toward or away from its cores in accordance with a geometrical progression as the shaft is rotated in accordance with an arithmetical progression.

8. A variable inductor comprising a plurality of inductors each comprising a pair of spaced cores, a winding encirclling portions of both of said cores, a magnetic shunt connecting the cores, magnetic flux generating means movable toward and away from said cores arranged to have the flux generated thereby pass sequentially through a portion of one core, through the shunt, and through a portion of the other core, a single rotary shaft common to all of the inductors, means connecting the shaft to the magnetic flux generating means of each inductor to cause the flux generating means of each inductor to move toward or away from its cores in accordance with a geometrical progression as the shaft is rotated in accordance with an arithmetical progression, and magnets disposed adjacent the cores of each inductor arranged to cause the magnetic flux generated thereby to pass sequentially through a portion of one core thereof, through the shunt, and through a portion of the other core thereof.

9. A variable inductor comprising a plurality of inductors each comprising a pair of spaced cores which are closed except for small air gaps, a winding encircling portions of both of said cores, a magnetic shunt connecting the cores, magnetic flux generating means movable toward and away from said cores arranged to have the flux generated thereby pass sequentially through a portion of one core, through the shunt, and through a portion of the other core, a single rotary shaft common to all of the inductors, means connecting the shaft to the magnetic flux generating means of each inductor to cause the flux generating means of each inductor to move toward or away from its cores in accordance with a geometrical progression as the shaft is rotated in accordance with an arithmetical progression, and magnets disposed adjacent the cores of each inductor arranged to cause the magnetic flux generated thereby to pass sequentially through a portion of one core thereof, through the shunt and through a portion of the other core thereof in sympathy with the flux generated by the flux generating means.

10. A variable inductor comprising a plurality of inductors each comprising a pair of spaced cores, a winding encircling portions of both of said cores, a magnetic shunt connecting the cores, magnetic flux generating means movable toward and away from said cores arranged to have the flux generated thereby pass sequentially through a portion of one core, through the shunt, and through a portion of the other core, a single rotary shaft common to all of the inductors, means connecting the shaft to the magnetic flux generating means of each inductor to cause the flux generating means of each inductor to move toward or away from its cores in accordance with a geometrical progression as the shaft is rotated in accordance with an arithmetical progression, and magnets disposed adjacent the cores of each inductor arranged to cause the magnetic flux generated thereby to pass sequentially through a portion of one core thereof, through the shunt, and through a portion of the other core thereof in opposition to the flux generated by the flux generating means.

11. A variable inductor comprising at least two closed cores, a winding encircling a portion of each of said cores, a magnetic flux generating means the axis of which is transverse to the plane of the core, magnetic shunt means connecting the cores remote from the flux generating means, and dialed adjusting means for adjusting the flux generating means toward and away from said closed core in accordance with a geometrical progression whereby the dial on the adjusting means may be divided substantially in accordance with an arithmetical progression.

12. A variable inductor comprising a plurality of pairs of closed cores, the closed cores of each pair having a shunt therebetween and a winding encircling a portion of both cores, magnetic flux generating means for each pair of cores the axis of which is arranged transversely to the planes of the cores of its respective pair, and means for simultaneously adjusting the magnetic flux generating means for all pairs of cores towards and away from the cores of their respective pairs.

13. A variable inductor comprising a plurality of pairs of closed cores, the closed cores of each pair having a shunt therebetween and a winding encircling a portion of both cores, magnetic flux generating means for each pair of cores the axis of which is arranged transversely to the planes of the cores of its respective pair, and means for simultaneously adjusting the magnetic flux generating means for all pairs of cores towards and away from the cores of their respective pairs, each pair of cores having a trimmer magnet associated therewith.

14. A variable inductor comprising a plurality of pairs of closed cores, the closed cores of each pair having a shunt therebetween and a winding encircling a portion of both cores, magnetic flux generating means for each pair of cores the axis of which is arranged transversely to the planes of the cores of its respective pair, and means for simultaneously adjusting the magnetic flux generating means for all pairs of cores towards and away from the cores of their respective pairs, each pair of cores having a trimmer magnet associated therewith whose axis is arranged transverse to the planes thereof.

References Cited in the file of this patent

UNITED STATES PATENTS

| | | |
|---|---|---|
| 1,612,414 | Brumder | Dec. 28, 1926 |
| 1,852,358 | Merkel | Apr. 5, 1932 |
| 2,038,281 | Gustafson | Apr. 21, 1936 |
| 2,158,252 | Polydoroff | May 16, 1939 |
| 2,503,155 | Harvey | Apr. 4, 1950 |
| 2,719,276 | Allison | Sept. 27, 1955 |

FOREIGN PATENTS

| | | |
|---|---|---|
| 233,163 | Great Britain | May 7, 1925 |
| 243,873 | Great Britain | Dec. 10, 1925 |